Aug. 31, 1943.

B. E. AHLPORT 2,328,118

MEANS FOR PREVENTING REVERSE FLOW FROM
BRANCH LINES TO SUPPLY MAINS

Filed Dec. 9, 1940

Inventor
BRODIE E. AHLPORT
By Hazard and Miller
Attorneys

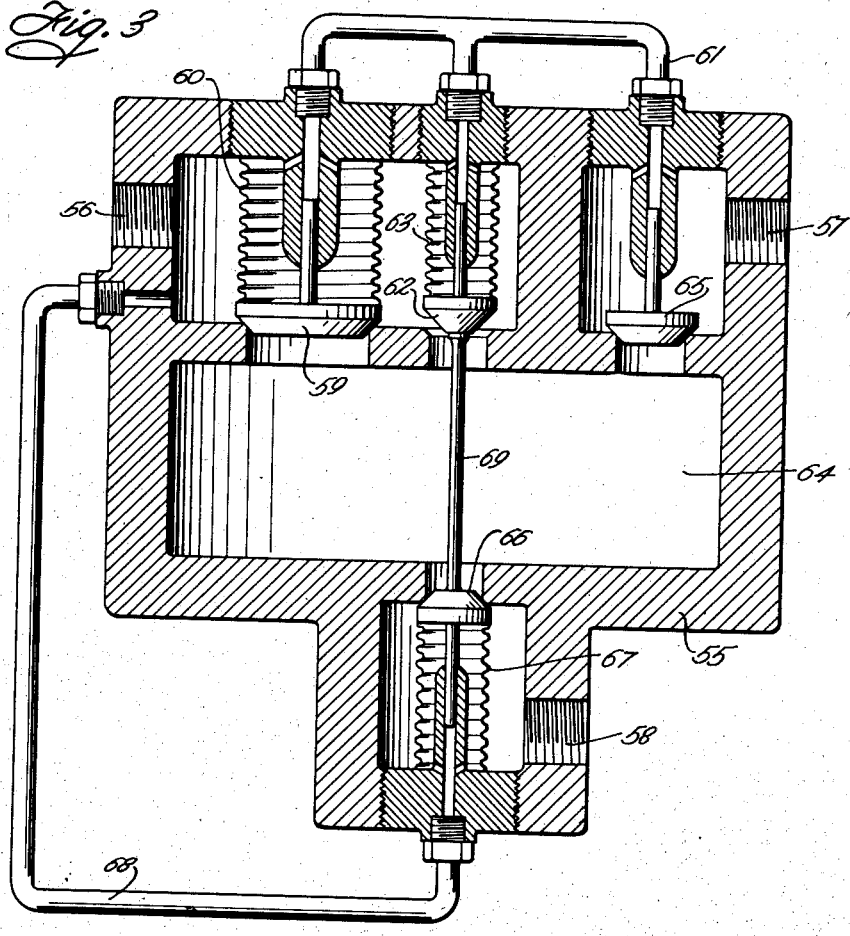

Patented Aug. 31, 1943

2,328,118

UNITED STATES PATENT OFFICE 2,328,118

MEANS FOR PREVENTING REVERSE FLOW FROM BRANCH LINES TO SUPPLY MAINS

Brodie E. Ahlport, Los Angeles, Calif.

Application December 9, 1940, Serial No. 369,220

11 Claims. (Cl. 277—70)

This invention relates to devices for preventing reverse flow from branch conduits to supply mains.

An object of the invention is to provide a device adapted to be installed in a branch pipe or conduit adjacent the supply main which will prevent siphoning or reverse flow from the branch line to the supply main in the event that pressure in the supply main falls below that in the branch line. In certain water main installations if the pressure in the water main falls due to unusually heavy withdrawals of water or breaks occurring therein, there is danger of siphoning water back into the main from the branch lines connected thereto. In some instances water is siphoned back through the branch lines and in other instances it may flow from the branch line to the water main by gravity. In either event there is danger of pollution of the water in the water main.

It has heretofore been proposed to incorporate check valves in the branch line or conduit that would prevent reverse flow. However, as the occasions when the pressure in the water main is less than the pressure in the supply line are relatively rare such check valves seldom have occasion to seat and consequently are apt to leak when called upon to prevent reverse flow. It has also been proposed to incorporate in the branch line anti-siphoning devices which serve to prevent siphoning action by the admission of air. Such devices are subject to the objection of admitting air to the main which might pollute to a limited extent only and in the case of gas mains would be seriously objectionable in that by admitting air to the main an explosive mixture of air and gas would be apt to be formed.

An object of the present invention is to provide a construction which is operable in response to the pressures in its inlet and outlet to prevent reverse flow from the branch line to the main without admitting air and without presenting a danger of polluting the fluid conducted by the main.

Another object is to provide a device wherein the valves are positively operated under the influence of pressure so that even though the valves may not be seated over a long period of time, yet when they are called upon to act they will be firmly seated against their seats to prevent leakage.

With the foregoing and other objects in view, which will be made manifest in the following detailed description and specifically pointed out in the appended claims, reference is had to the accompanying drawings for an illustrative embodiment of the invention wherein:

Fig. 3 is a sectional view through still another alternative form embodying the invention.

Figure 1:
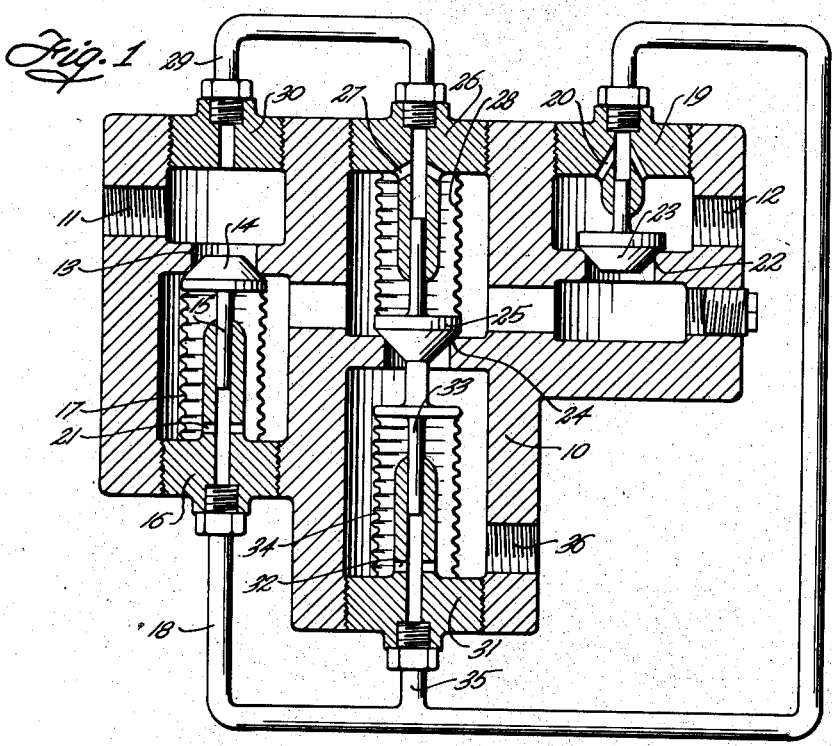
Figure 1 is a sectional view through one device embodying the invention, this being the preferred form of construction.

Referring to the accompanying drawings wherein similar reference characters indicate similar parts throughout, the device illustrated in Fig. 1 comprises a suitable body 10 adapted to be mounted or incorporated in a branch line or conduit preferably adjacent its connection with the supply main. This body has an inlet indicated at 11 leading from the main and an outlet 12 leading to the branch line. Adjacent the inlet 11 there is a valve seat 13 for a valve 14, the stem of which, indicated at 15, is slidably guided by means of a valve guide formed on a plug 16. A metallic bellows 17 connects the back of the valve 14 with the inner side of plug 16. Any equivalent pressure responsive means such as for example a piston or diaphragm could be used in substitution for the metallic bellows 17 and the other metallic bellows hereinafter described. The interior of the bellows is adapted to be supplied with fluid pressure through a tube 18 connected to plug 19 adjacent the outlet 12. Ports 20 are formed in the plug 19 for the purpose of conveying the pressure present in outlet 12 through tube 18 and through ports 21 to the interior of the bellows.

Adjacent the outlet 12 there is formed a seat 22 for a check valve 23 the stem of which is guided by a stem guide formed on the underside of plug 19. The two valves 14 and 23 constitute check valves arranged in series between the inlet 11 and the outlet 12 and in the passage through the body 10 that connects the inlet with the outlet.

Adjacent the center of the body there is a valve seat 24 for a normally closed drain valve 25. The drain valve 25 has its stem guided by a guide on the underside of a plug 26 which is ported as at 27 and is equipped with a metallic bellows 28. A tube 29 connects the hollow interior of plug 26 with an apertured plug 30 so that pressure at the inlet 11 is conveyed through the tube 29 to the interior of bellows 28 to expand the bellows and to urge the valve 25 to seat or to remain closed.

Adjacent the bottom of the body there is a plug 31 ported as at 32 and providing a guide for a stem 33 which is equipped with a metallic bellows 34. The stem 33 bears against the underside of valve 25 and when the interior of bellows 34 is subjected to a greater pressure than the pressure within bellows 28 it is effective to open valve 25. A branch tube 35 leads from tube 18 to the interior of bellows 34. A drain outlet 36 leads from the bottom of the body 10 and may have a drain tube, not shown, connected thereto. The bellows 28 and 34 are so constructed and arranged that whenever the pressures therein are equal the drain valve 25 will be closed so that the drain valve is initially in closed position.

The operation of the above-described construction is as follows. Normally the pressure in the inlet 11 will be equal to or greater than the pressure in outlet 12. Under these circumstances whenever the pressure in the inlet 11 is greater than the pressure in the outlet 12 it is effective to open valves 14 and 23 permitting flow from the supply main to the branch line. However, if for any reason pressure in the outlet 12 should become greater than the pressure in the inlet 11 so that there would be a tendency for reverse flow, valve 23 would tend to seat by gravity. However, in the event that this valve should leak it is important to prevent contamination in the supply main. Consequently, the excess of pressure in the outlet 12 is transmitted through tube 18 to the interior of bellows 17 and is effective to cause valve 14 to close. As there might possibly be some leakage between valve 14 and its seat provision is made for draining out of the device all fluid between the two check valves. To this end the outlet pressure at 12 on being transmitted to the interior of bellows 34 and being greater than the inlet pressure transmitted to the interior of bellows 28, bellows 34 becomes effective to open or unseat the drain valve 35 permitting fluid between the two valves 14 and 23 to drain through the drain outlet 36. Consequently, if valve 23 should leak the leakage is drained out of the construction so that there is no opportunity for leakage to flow back into the main past valve 14. The opening of the drain outlet also interposes a protective air space between fluid in the main and fluid in the branch line and in addition effects a sudden and complete drop in pressure in back of the outlet valve which aids in its closing with a positive snap action, thus wire drawing and chattering are effectively prevented and the outlet valve is urged to firmly seat.

Whenever normal conditions are restored so that the inlet pressure exceeds the outlet pressure valves 14 and 23 open and as the pressure within bellows 28 exceeds the pressure within bellows 34 the drain valve 25 again closes restricting flow from the inlet to the outlet and permitting none of it to pass to the drain outlet 36.

Figure 2:
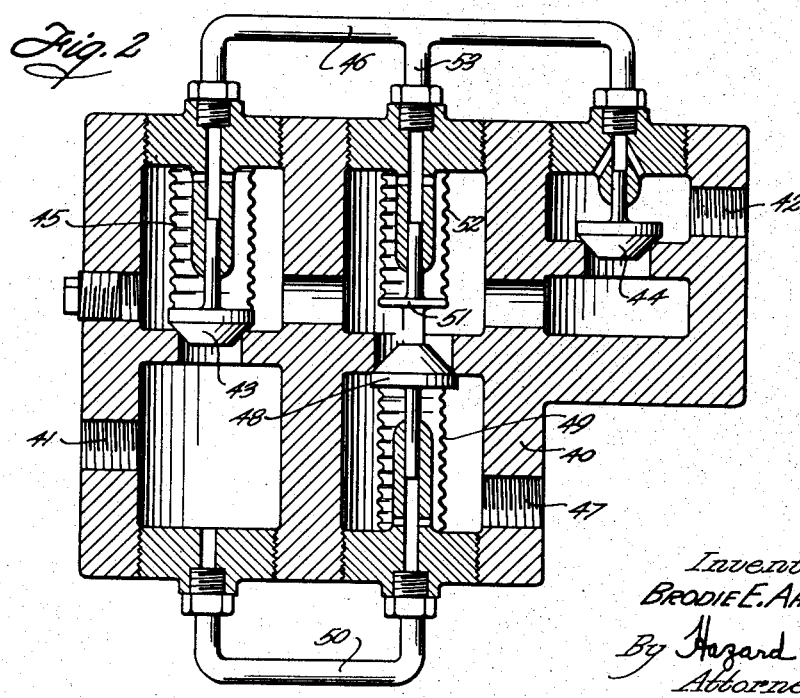
Fig. 2 is a sectional view through the device embodying an alternative form that may be employed.

In Fig. 2 an alternative form of construction is disclosed wherein the body 40 is equipped with an inlet 41 and an outlet 42. Within the body there are two check valves 43 and 44 arranged in series. The check valve 43 is equipped with a metallic bellows 45 which is supplied with internal pressure through tube 36 from the outlet 42. The drain outlet is indicated at 47 and the drain valve is indicated at 48. The drain valve is equipped with a bellows 49 which is supplied with internal pressure equal to that at the inlet through tube 50. A stem 51 is equipped with a bellows 52 internally supplied with pressure through a branch tube 53 equal to the pressure adjacent the outlet 42. In this form of construction it will be noted that the exposed area of the drain valve when seated is subject to the pressure that may be in the body 40 between the valves 43 and 44 and that this exposed area is greater than the area exposed on the bottom of stem 51 within the bellows 52. The two bellows 52 and 49 are of the same diameter. The purpose of this construction is to cause the drain valve 48 to open not only when the pressure at the outlet 42 is in excess of the pressure at the inlet 41 but also when the pressure in the body between the two valves 43 and 44 is in excess of the inlet pressure. Under normal conditions when the inlet pressure is in excess of the outlet pressure, valves 43 and 44 will be forced open by the inlet pressure and the drain valve 48 will be forced closed by the inlet pressure in bellows 49 being greater than the outlet pressure in bellows 52. Whenever the outlet pressure exceeds the inlet pressure, however, valve 44 closes and the outlet pressure is conveyed to the interior of bellows 45 causing valve 43 to close. At the same time outlet pressure is conveyed to the interior of bellows 52 and this being in excess of the inlet pressure in bellows 49, the drain valve 48 will open permitting drainage to take place to the drain outlet 47. The drain valve 48 will also open whenever the pressure between valves 43 and 44 is in excess of the inlet pressure. The pressure between the valves 43 and 44 being effective on the exposed surface of valve 48 urges this valve to open overcoming the lower pressure of the inlet which is within bellows 49.

In Fig. 3 there is illustrated another form embodying the invention wherein the body 55 has an inlet 56, an outlet 57, and a drain outlet 58. Adjacent the inlet there is a main valve 59 influenced by a metallic bellows 60 which receives on its interior fluid pressure from the outlet 57 through a tube or conduit 61. Adjacent the main valve 59 there is an auxiliary valve 62 which is also influenced by a bellows 63 which receives in its interior fluid pressure from the tubing or conduit 61. The auxiliary valve 62 which may be regarded as a type of pilot valve and the main valve 59 control the flow from the inlet 56 to a lower chamber 64 which in turn leads to the outlet 57 past a check valve 65. Adjacent the drain outlet 58 there is a drain valve 66 influenced by a bellows 67 the interior of which is in communication with the inlet pressure at 56 by means of a tube or conduit 68. The valves 62 and 66 operate in unison and in opposition to each other and to this end may be connected by a connecting rod 69. In some instances this connecting rod may be fastened to one valve and merely bear upon the other.

The operation of this form of construction is as follows. Whenever the inlet pressure 56 is in excess of the outlet pressure at 57, the inlet pressure which is transmitted to bellows 67 is effective to close valve 66 and open valve 62. The pressure within chamber 64 will then be equal to the inlet pressure by virtue of valve 62 being open and this pressure being in excess of the outlet pressure at 57 and consequently the pressure within bellows 60 will open the main valve 59. When, however, conditions are such that the pressure at the outlet 57 is in excess of the pressure at the inlet 56 this is effective to cause bellows 63 to close valve 62 and open valve 66 with the result that the pressure in chamber 64 quickly reduces to atmospheric pressure if outlet 58 merely leads to the atmosphere. If the drain outlet 58 leads to some other locality of reduced pressure the pressure at 64 is quickly reduced to this reduced pressure. Consequently, by suddenly reducing the pressure in chamber 64 by opening valve 66 the check valve 65 is urged firmly against its seat and likewise the pressure at outlet 57 which is present in bellows 60 being unopposed is similarly forced firmly against its seat.

From the above-described constructions it will be appreciated that a device has been provided which will effectively prevent reverse flow from a branch line or conduit to a supply main. Two check valves are employed to prevent this reverse flow which if either or both leak, are adequately protected by the opening of the drain valve to prevent leakage back into the supply main. Contamination of the fluid in the supply main is thus completely prevented. Although I have illustrated the connections for conveying the inlet and outlet pressures as being formed by tubing arranged externally of the body it will of course be appreciated that corresponding passages may be formed by drilled or cored passages formed in the body itself.

Various changes may be made in the details of construction without departing from the spirit or scope of the invention as defined by the appended claims.

I claim:

1. A device of the class described comprising a body having an inlet and an outlet, two check valves arranged in series in the body between the inlet and outlet, a drain outlet between the check valves, a drain valve normally closing the drain outlet, pressure responsive means subject to pressure in the inlet ahead of the check valve therein urging the drain valve to close, and pressure responsive means subject to pressure in the outlet behind the check valve therein urging the drain valve to open, said pressure responsive means being so constructed and arranged that when the pressure in the outlet exceeds the pressure in the inlet the drain valve will be opened.

2. A device of the class described comprising a body having an inlet and an outlet, two check valves arranged in series in the body between the inlet and outlet, a drain outlet between the check valves, a drain valve normally closing the drain outlet, pressure responsive means subject to pressure in the inlet urging the drain valve to close, pressure responsive means subject to pressure in the outlet urging the drain valve to open, and pressure responsive means subject to pressure in the outlet urging the check valve most adjacent the inlet to close whereby when pressure in the outlet exceeds the pressure in the inlet the drain valve will be opened and the check valve most adjacent the inlet will be closed.

3. A device of the class described comprising a body having an inlet, an outlet, and a drain outlet, a bellows closed valve adjacent the inlet controlling flow therethrough, means conveying pressure from the outlet to the bellows to urge the valve to close, said valve being capable of being opened by inlet pressure exceeding the outlet pressure, a normally closed drain valve controlling the drain outlet, and pressure responsive means subject to the pressures in the inlet and outlet for causing the normally closed drain valve to open whenever the outlet pressure exceeds the inlet pressure.

4. A device of the class described comprising a body having an inlet, an outlet, and a drain outlet, a bellows closed valve adjacent the inlet controlling flow therethrough, means conveying pressure from the outlet to the bellows to urge the valve to close, said valve being capable of being opened by inlet pressure exceeding the outlet pressure, a normally closed drain valve controlling the drain outlet, pressure responsive means subject to the pressures in the inlet and outlet for causing the normally closed drain valve to open whenever the outlet pressure exceeds the inlet pressure, and a check valve preventing reverse flow through the outlet.

5. A device of the class described comprising a body having an inlet, an outlet, and a drain outlet, a bellows closed valve adjacent the inlet controlling flow therethrough, means conveying pressure from the outlet to the bellows to urge the valve to close, said valve being capable of being opened by inlet pressure exceeding the outlet pressure, a normally closed drain valve controlling the drain outlet, bellows means subject to inlet pressure urging the normally closed drain valve to close and bellows means subject to outlet pressure urging the normally closed drain valve to open whereby it may open whenever the outlet pressure exceeds the inlet pressure.

6. A device of the class described comprising a body having an inlet, an outlet, and a drain outlet, a bellows closed valve adjacent the inlet controlling flow therethrough, means conveying pressure from the outlet to the bellows to urge the valve to close, said valve being capable of being opened by inlet pressure exceeding the outlet pressure, a normally closed drain valve controlling the drain outlet, bellows means subject to inlet pressure urging the normally closed drain valve to close and bellows means subject to outlet pressure urging the normally closed drain valve to open whereby it may open whenever the outlet pressure exceeds the inlet pressure, and a check valve preventing reverse flow through the outlet.

7. A device of the class described comprising a body having an inlet and an outlet, two check valves arranged in series between the inlet and the outlet, a drain outlet between the check valves, a drain valve for opening and closing the drain outlet, said drain valve being influenced by inlet pressure ahead of the check valve therein urging it to close and by outlet pressure behind the check valve therein urging it to open in such a manner that the drain valve will be closed by the inlet pressure whenever the inlet pressure exceeds the outlet pressure and opened by the outlet pressure whenever the outlet pressure exceeds the inlet pressure.

8. A device of the class described comprising a body having an inlet and an outlet, two check valves arranged in series between the inlet and the outlet, a drain outlet between the check valves, a drain valve for opening and closing the drain outlet, pressure responsive means connected to the inlet ahead of the check valve therein so as to be responsive to inlet pressure urging the drain valve to close, and pressure responsive means connected to the outlet behind the check valve therein so as to be responsive to outlet pressure urging the valve to open, said pressure responsive means being so constructed and arranged that the drain valve will be closed by the inlet pressure whenever the inlet pressure exceeds the outlet pressure and opened by the outlet pressure whenever the outlet pressure exceeds the inlet pressure.

9. A device of the class described comprising a body having an inlet and an outlet, valves arranged adjacent the inlet and outlet permitting inward flow through the inlet and outward flow through the outlet but preventing flow in the reverse direction, there being a drain outlet between the valves, a drain valve controlling the drain outlet, bellows arranged upon opposite sides of the drain valve, means for conducting inlet pressure ahead of the check valve in the inlet to that bellows which when subjected to pressure will urge the drain valve to close, and means conducting outlet pressure behind the check valve in the outlet to that bellows which when subjected to pressure will urge the drain valve to open, said bellows being so constructed and arranged that the drain valve will be closed by the inlet pressure when the inlet pressure exceeds the outlet pressure, and the drain valve will be opened when the outlet pressure exceeds the inlet pressure.

10. A device of the class described comprising a body having an inlet and an outlet, valves arranged adjacent the inlet and outlet permitting inward flow through the inlet and outward flow through the outlet but preventing flow in the reverse direction, there being a drain outlet between the valves, a drain valve controlling the drain outlet, bellows arranged upon opposite sides of the drain valve, means of conducting inlet pressure to that bellows which when subjected to pressure will urge the drain valve to close, means conducting outlet pressure to that bellows which when subjected to pressure will urge the drain valve to open whereby the drain valve will be closed by the inlet pressure when the inlet pressure exceeds the outlet pressure and the drain valve will be opened when the outlet pressure exceeds the inlet pressure, the valve adjacent the inlet having a bellows connected to the outlet so as to be subject to outlet pressure whereby the valve adjacent the inlet will be urged to close by outlet pressure whenever the outlet pressure exceeds the inlet pressure although the drain valve may be open.

11. A device of the class described comprising a body having an inlet and an outlet, valves arranged adjacent the inlet and outlet permitting inward flow through the inlet and outward flow through the outlet but preventing flow in the reverse direction, there being a drain outlet between the valves, a drain valve controlling the drain outlet, means responsive to the pressures in the inlet and outlet for causing the drain valve to close whenever the inlet pressure exceeds the outlet pressure and for causing the drain valve to open when the outlet pressure exceeds the inlet pressure, and means responsive to pressure in the outlet for causing the valve adjacent the inlet to close whenever the outlet pressure exceeds the inlet pressure although the drain valve may be open.

BRODIE E. AHLPORT.